(12) United States Patent
He et al.

(10) Patent No.: US 12,210,558 B2
(45) Date of Patent: Jan. 28, 2025

(54) MULTIMEDIA FILE STORAGE AND ACCESS METHOD

(71) Applicant: SHANGHAI BILIBILI TECHNOLOGY CO., LTD., Shanghai (CN)

(72) Inventors: Jun He, Shanghai (CN); Yi Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 12 days.

(21) Appl. No.: 17/625,306

(22) PCT Filed: Apr. 13, 2020

(86) PCT No.: PCT/CN2020/084518
§ 371 (c)(1),
(2) Date: Jan. 6, 2022

(87) PCT Pub. No.: WO2021/012723
PCT Pub. Date: Jan. 28, 2021

(65) Prior Publication Data
US 2022/0365959 A1    Nov. 17, 2022

(30) Foreign Application Priority Data

Jul. 23, 2019    (CN) .......................... 201910668459.1

(51) Int. Cl.
*G06F 16/41* (2019.01)
*G06F 16/25* (2019.01)
(Continued)

(52) U.S. Cl.
CPC ............ *G06F 16/41* (2019.01); *G06F 16/258* (2019.01); *G06F 16/483* (2019.01);
(Continued)

(58) Field of Classification Search
CPC ...... G06F 16/41; G06F 16/258; G06F 16/483; G06F 16/487; H04N 21/231; H04N 21/83;
(Continued)

(56) References Cited

U.S. PATENT DOCUMENTS

2007/0162611 A1\* 7/2007 Yu ...................... H04N 21/4325
348/E5.002
2014/0040500 A1\* 2/2014 Zheng .................. H04N 21/238
709/231

(Continued)

FOREIGN PATENT DOCUMENTS

CN      102447673 A      5/2012
CN      102510519 A    * 6/2012    ..... H04N 21/234309
(Continued)

OTHER PUBLICATIONS

European Patent Application No. 20843920.8; Extended Search Report; dated Jul. 7, 2022; 8 pages.
(Continued)

*Primary Examiner* — Apu M Mofiz
*Assistant Examiner* — Oscar Wehovz
(74) *Attorney, Agent, or Firm* — BakerHostetler

(57) ABSTRACT

The present disclosure describes techniques of storing and accessing multimedia files. The techniques comprise obtaining at least two multimedia files; performing format parsing for each of the at least two multimedia files separately to obtain audio encoding data, video encoding data, and container format data of each of the at least two multimedia files; storing the container format data of each of the at least two multimedia files separately, and storing one copy of the audio encoding data and video encoding data; and generating and storing index data comprising information of identifying encoding offset of the container format data, the
(Continued)

audio encoding data, and the video encoding data in each of the at least two multimedia files, and comprising information indicative of storage address of the container format data, the audio encoding data, and the video encoding data of each of the at least two multimedia files.

16 Claims, 4 Drawing Sheets

(51) Int. Cl.
*G06F 16/483* (2019.01)
*H04N 21/231* (2011.01)
*H04N 21/83* (2011.01)
*H04N 21/854* (2011.01)

(52) U.S. Cl.
CPC ........... *H04N 21/231* (2013.01); *H04N 21/83* (2013.01); *H04N 21/85406* (2013.01)

(58) Field of Classification Search
CPC .......... H04N 21/85406; H04N 21/8456; H04L 65/40
See application file for complete search history.

(56) References Cited

U.S. PATENT DOCUMENTS

| | | | |
|---|---|---|---|
| 2014/0126883 A1* | 5/2014 | Yogeshwar | H04N 5/76 386/241 |
| 2015/0227436 A1* | 8/2015 | Wilson | G06F 11/1453 707/692 |
| 2015/0378837 A1* | 12/2015 | Bai | G06F 11/1435 707/654 |
| 2019/0052937 A1* | 2/2019 | Malamal Vadakital | H04N 21/85406 |
| 2021/0258659 A1* | 8/2021 | Hannuksela | H04N 21/85406 |

FOREIGN PATENT DOCUMENTS

| | | |
|---|---|---|
| CN | 102769638 A | 11/2012 |
| CN | 102802022 A | 11/2012 |
| CN | 103002353 A | 3/2013 |
| CN | 103929478 A | 7/2014 |
| CN | 105072368 A | 11/2015 |

OTHER PUBLICATIONS

International Patent Application No. PCT/CN2020/084518; Int'l Written Opinion and Search Report; dated Jul. 1, 2020; 7 pages.

* cited by examiner

MULTIMEDIA FILE STORAGE AND ACCESS METHOD

CROSS-REFERENCE TO RELATED APPLICATION

The present application is the U.S. National Stage of International Application No. PCT/CN2020/084518, filed on Apr. 13, 2020, which claims the priority of the Chinese Patent Application No. 201910668459.1, filed on Jul. 23, 2019, entitled "Multimedia file storage and access method", the entirety of which is incorporated herein by reference.

TECHNICAL FIELD

The present application relates to the field of multimedia data processing, and in particular to a method of multimedia file storage and access.

BACKGROUND

With the rapid development of mobile terminals, especially the rapid development of smart phone mobile terminals, many users prefer playing multimedia files through web pages or APPs (applications) to enrich their spiritual and entertainment life. Correspondingly, a variety of container formats in which multimedia files are encapsulated have also been derived, such as MP4, FLV, RMVB, AVI, MOV, and WMV. Generally, different service scenarios may require multimedia files in different formats to be played. For example, a website supports the MP4 format, and an APP supports the FLV format. Multimedia files in multiple container formats required for different services need to be stored in a server, and the multimedia files in different container formats have the same audio encoding data and video encoding data, causing the duplicate storage of the same audio encoding data and video encoding data, and further causing a tremendous waste of a storage space.

SUMMARY

In order to overcome the deficiencies of the prior art described above, an objective of the present application is to provide a method of multimedia file storage and access, to solve the problem in the prior art of waste of a storage space due to the need to store multimedia files in multiple container formats required for different services.

In order to achieve the above object, the present application provides a method of multimedia file storage, which includes:
  obtaining at least two multimedia files to be stored, where the at least two multimedia files have same audio encoding data, same video encoding data, and different container format data;
  performing format parsing for each of the at least two multimedia files separately to obtain audio encoding data, video encoding data, and container format data of each of the at least two multimedia files;
  storing the container format data of each of the at least two multimedia files separately, and storing one copy of the audio encoding data and video encoding data; and
  establishing and storing index data identifying encoding offset information and storage address information of the container format data, audio encoding data, and video encoding data of each of the at least two multimedia files.

In a preferred embodiment of the present application, obtaining at least two multimedia files to be stored includes:
  receiving a multimedia source file in an original container format;
  converting the multimedia source file into at least one target container format different from the original container format; and
  determining the multimedia source file in the original container format and the multimedia source file in the at least one target container format as the at least two multimedia files to be stored.

In a preferred embodiment of the present application, performing format parsing for each of the at least two multimedia files separately to obtain audio encoding data, video encoding data, and container format data of each of the at least two multimedia files includes:
  parsing the audio encoding data of each of the at least two multimedia files according to the container format of each of the at least two multimedia files;
  parsing the video encoding data of each of the at least two multimedia files according to the container format of each of the at least two multimedia files; and
  generating the container format data of each of the at least two multimedia files according to data other than the audio encoding data and the video encoding data of each of the at least two multimedia files.

In a preferred embodiment of the present application, storing the container format data of each of the at least two multimedia files separately, and storing one copy of the audio encoding data and video encoding data includes:
  storing the container format data of each of the at least two multimedia files in a predetermined container format data storage separately;
  storing one copy of the audio encoding data in a predetermined audio encoding data storage; and
  storing one copy of the video encoding data in a predetermined video encoding data storage.

In a preferred embodiment of the present application, the video encoding data storage is a local storage.

In a preferred embodiment of the present application, establishing and storing index data identifying encoding offset information and storage address information of the container format data, audio encoding data, and video encoding data of each of the at least two multimedia files includes:
  establishing the index data, where the index data identifies the encoding offset information and storage address information of the container format data, audio encoding data, and video encoding data of each of the at least two multimedia files; and
  storing the index data in a predetermined index data storage.

In a preferred embodiment of the present application, the method of multimedia file storage further includes:
  saving storage addresses of the container format data, the audio encoding data, and the index data into a predetermined first database.

In order to achieve the above object, the present application provides an apparatus of multimedia file storage, which includes:
  a file obtaining module, configured to obtain at least two multimedia files to be stored, wherein the at least two multimedia files have same audio encoding data, same video encoding data and different container format data;
  a file analysis module, configured to perform format parsing for each of the at least two multimedia files separately to obtain audio encoding data, video encoding data, and container format data of each of the at least two multimedia files;

a file data storage module, configured to store the container format data of each of the at least two multimedia files separately, and store one copy of the audio encoding data and video encoding data; and an index establishment module, configured to establish and store index data identifying encoding offset information and storage address information of the container format data, audio encoding data, and video encoding data of each of the at least two multimedia files.

In order to achieve the above object, the present application provides a computer device, which includes a memory, a processor, and computer-readable instructions stored on the memory and executable on the processor, where the processor, upon executing the computer-readable instructions, performs the steps of:

obtaining at least two multimedia files to be stored, wherein the at least two multimedia files have same audio encoding data, same video encoding data, and different container format data;

performing format parsing for each of the at least two multimedia files separately to obtain audio encoding data, video encoding data, and container format data of each of the at least two multimedia files;

storing the container format data of each of the at least two multimedia files separately, and storing one copy of the audio encoding data and video encoding data; and establishing and storing index data identifying encoding offset information and storage address information of the container format data, audio encoding data, and video encoding data of each of the at least two multimedia files.

In order to achieve the above object, the present application provides a computer-readable storage medium having stored thereon computer-readable instructions, which upon executed by a processor, cause the processor to perform the steps of:

obtaining at least two multimedia files to be stored, wherein the at least two multimedia files have same audio encoding data, same video encoding data, and different container format data;

performing format parsing for each of the at least two multimedia files separately to obtain audio encoding data, video encoding data, and container format data of each of the at least two multimedia files;

storing the container format data of each of the at least two multimedia files separately, and storing one copy of the audio encoding data and video encoding data; and establishing and storing index data identifying encoding offset information and storage address information of the container format data, audio encoding data, and video encoding data of each of the at least two multimedia files.

In order to achieve the above object, the present application further provides a method of multimedia file access, for accessing a multimedia file stored according to the foregoing method, including:

receiving request information for access of a target multimedia file;

obtaining, according to the request information, index data corresponding to the target multimedia file;

obtaining, according to the obtained index data, storage address information and encoding offset information of container format data, audio encoding data, and video encoding data of the target multimedia file;

obtaining the container format data, audio encoding data, and video encoding data of the target multimedia file according to the storage address information of the container format data, audio encoding data, and video encoding data of the target multimedia file; and assembling the obtained container format data, audio encoding data, and video encoding data according to the encoding offset information of the container format data, audio encoding data, and video encoding data of the target multimedia file to obtain the target multimedia file.

In a preferred embodiment of the present application, obtaining, according to the request information, index data corresponding to the target multimedia file includes:

obtaining, from a predetermined index data storage and according to the request information, the index data corresponding to the target multimedia file.

In a preferred embodiment of the present application, obtaining the container format data, audio encoding data, and video encoding data of the target multimedia file according to the storage address information of the container format data, audio encoding data, and video encoding data of the target multimedia file includes:

obtaining the container format data of the target multimedia file from a preset container format data storage and according to the storage address information of the container format data of the target multimedia file;

obtaining the audio encoding data of the target multimedia file from a predetermined audio encoding data storage and according to the storage address information of the audio encoding data of the target multimedia file; and obtaining the video encoding data of the target multimedia file from a predetermined video encoding data storage and according to the storage address information of the video encoding data of the target multimedia file.

In a preferred embodiment of the present application, the video encoding data storage is a local storage.

In a preferred embodiment of the present application, assembling the obtained container format data, audio encoding data, and video encoding data according to the encoding offset information of the container format data, audio encoding data, and video encoding data of the target multimedia file to obtain the target multimedia file includes:

downloading the obtained container format data, audio encoding data, and index data to the local storage; and assembling the container format data, audio encoding data, and video encoding data at the local storage according to the encoding offset information of the container format data, audio encoding data, and video encoding data of the target multimedia file to obtain the target multimedia file.

In a preferred embodiment of the present application, downloading the obtained container format data, audio encoding data, and index data to the local storage further includes:

caching the container format data, audio encoding data, and index data that is downloaded to the local storage.

In a preferred embodiment of the present application, the request information includes a encoding offset range, and obtaining, according to the obtained index data, storage address information and encoding offset information of container format data, audio encoding data, and video encoding data of the target multimedia file includes:

obtaining, from the index data, storage address information and data types corresponding to the encoding offset range, where the data type includes an container format data type, an audio encoding data type, and a video encoding data type; and obtaining, according to the storage address information and the data types corresponding to the encoding offset range, the storage address information and encoding offset information of the container format data, audio encoding data, and video encoding data of the target multimedia file.

In order to achieve the above object, the present application provides an apparatus of multimedia file access, which includes:

a request receiving module, configured to receive request information for accessing a target multimedia file;

an index data obtaining module, configured to obtain, according to the request information, index data corresponding to the target multimedia file;

an index analysis module, configured to obtain, according to the obtained index data, storage address information and encoding offset information of container format data, audio encoding data, and video encoding data of the target multimedia file;

a file data obtaining module, configured to obtain the container format data, audio encoding data, and video encoding data of the target multimedia file according to the storage address information of the container format data, audio encoding data, and video encoding data of the target multimedia file; and an assembling module, configured to assemble the obtained container format data, audio encoding data, and video encoding data according to the encoding offset information of the container format data, audio encoding data, and video encoding data of the target multimedia file to obtain the target multimedia file.

In order to achieve the above object, the present application provides a computer device, which includes a memory, a processor, and computer-readable instructions stored on the memory and executable on the processor, where upon executing the computer-readable instructions, performs the steps of:

receiving request information for accessing a target multimedia file;

obtaining, according to the request information, index data corresponding to the target multimedia file;

obtaining, according to the obtained index data, storage address information and encoding offset information of container format data, audio encoding data, and video encoding data of the target multimedia file;

obtaining the container format data, audio encoding data, and video encoding data of the target multimedia file according to the storage address information of the container format data, audio encoding data, and video encoding data of the target multimedia file; and assembling the obtained container format data, audio encoding data, and video encoding data according to the encoding offset information of the container format data, audio encoding data, and video encoding data of the target multimedia file to obtain the target multimedia file.

In order to achieve the above object, the present application provides a computer-readable storage medium having stored thereon computer-readable instructions, which upon executed by a processor, cause the processor to perform the steps of:

receiving request information for accessing a target multimedia file;

obtaining, according to the request information, index data corresponding to the target multimedia file;

obtaining, according to the obtained index data, storage address information and encoding offset information of container format data, audio encoding data, and video encoding data of the target multimedia file;

obtaining the container format data, audio encoding data, and video encoding data of the target multimedia file according to the storage address information of the container format data, audio encoding data, and video encoding data of the target multimedia file; and assembling the obtained container format data, audio encoding data, and video encoding data according to the encoding offset information of the container format data, audio encoding data, and video encoding data of the target multimedia file to obtain the target multimedia file.

By adopting of the above technical solutions, the present application has the beneficial effects as follows.

In the present application, for multiple multimedia files with the same content and different container formats, only one copy of the same audio encoding data and video encoding data is stored, different pieces of container format data are separately stored, and encoding offset information of the pieces of data is also stored. During access, audio encoding data, video encoding data, and container format data of a target multimedia file, and encoding offset information of the data are obtained, and then the audio encoding data, video encoding data, and container format data are assembled according to the encoding offset information. As such, the present application can solve the problem in the prior art that multimedia files in multiple container formats required for different services need to be saved, causing the duplicate storage of the same audio encoding data and video encoding data, and further causing a tremendous waste of the storage space.

DETAILED DESCRIPTION OF EMBODIMENTS

In order to make the objectives, technical solutions, and advantages of the present application clearer, the present application will be further described in detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

It should be noted that the descriptions related to "first", "second", etc. in the present application are merely used for the illustrative purpose, and should not be construed as indicating or implying the relative importance thereof or implicitly indicating the number of technical features indicated. Thus, features defined with "first" and "second" may explicitly or implicitly comprise at least one of the features. Additionally, the terms used in the present application are merely for the purpose of describing particular embodiments and are not intended to limit the present disclosure. The terms "a/an", "said" and "the" in the singular form used in the present application and the appended claims are also intended to include the plural form unless otherwise clearly indicated in the context.

Figure 1:
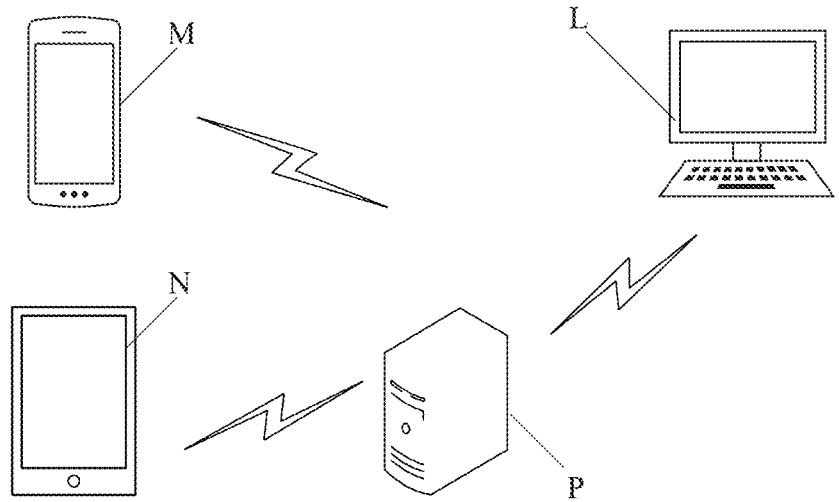
FIG. 1 is a schematic diagram of an environment in which a method of multimedia file storage and access is applied according to the present application.

Referring to FIG. 1, it is a schematic diagram of an application environment for an embodiment of a method of multimedia file storage and access according to the present application. The schematic diagram of the application environment includes clients M, N, and L and a server P. The server P can exchange data with the clients M, N, and L by means of suitable technologies, such as a network and a near-field communication technology. The clients M, N, and L include, but are not limited to, any smart electronic product that can interact with a user by means of a keyboard, a mouse, a remote controller, a touch pad, or a voice-operated device, etc., for example, a mobile device such as a personal computer, a tablet computer, a smart phone, a personal digital assistant (PDA), a game console, a smart wearable device and a navigation apparatus, or a stationary terminal such as a digital TV, a desktop computer and a notebook computer. The server P may be a computer, or a single network server, a server group composed of multiple network servers, or a cloud composed of a large number of cloud computing-based hosts or network servers, where cloud computing is a type of distributed computing, and is a virtual supercomputer consisting of a cluster of loosely coupled computer sets.

Embodiment I

Figure 2:
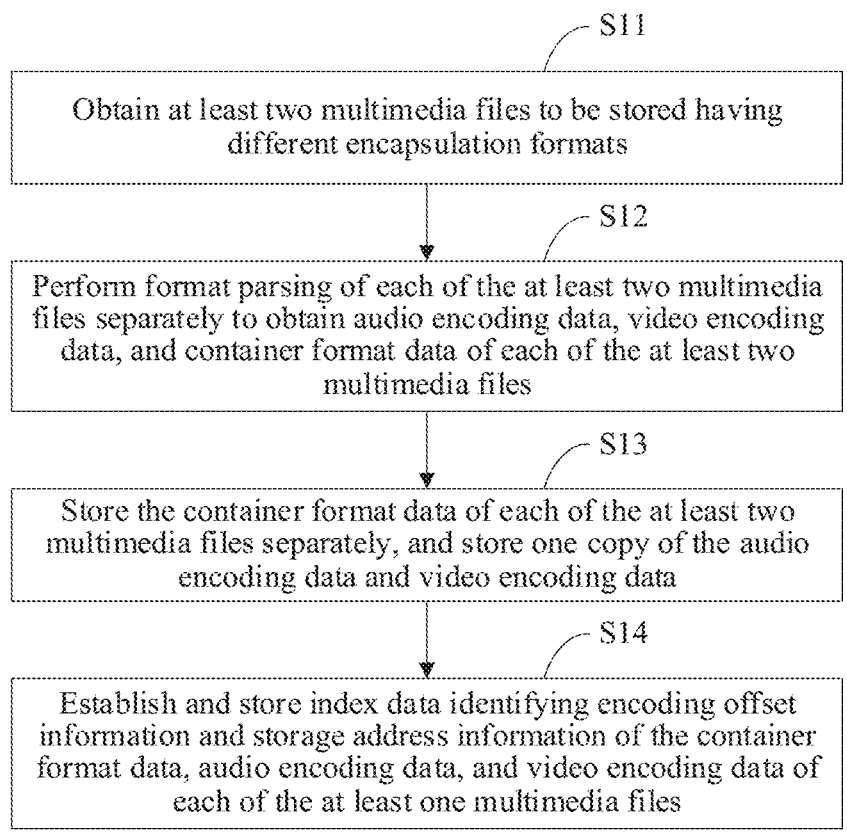
FIG. 2 is a flowchart of an embodiment of a method of multimedia file storage according to the present application.
Figure 2A:
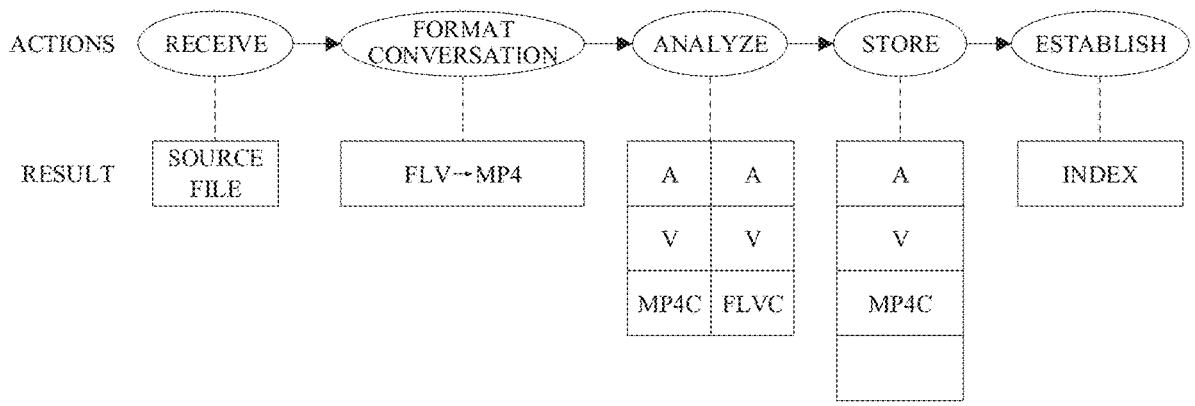
FIG. 2A is a schematic diagram of the principle of an embodiment of a method of multimedia file storage according to the present application.

This embodiment provides a method of multimedia file storage, which is applicable to a server. As shown in FIGS. 2 and 2A, the method includes the steps as follows.

In S11, at least two multimedia files to be stored are obtained, where the at least two multimedia files have the same audio encoding data, the same video encoding data, and different container format data, that is, the two multimedia files to be stored having the same content and different container formats. For example, the obtained multimedia files are a movie A.MP4 and a movie A.FLV, where the movies A.MP4 and A.FLV have exactly the same audio and video content and only different container formats. In the present application, the multimedia files refer to audio and video files, and the container formats thereof may be MP4, FLV, RMVB, AVI, MOV, or WMV, etc.

This step is specifically implemented by means of: receiving, after a data source uploads a multimedia source file in an original container format, the multimedia source file in the original container format that is uploaded by the data source; converting the multimedia source file into at least one target container format different from the original container format; and determining the multimedia source file in the original container format and the multimedia source file in the at least one target container format as the multimedia files to be stored. The target container format can be pre-determined according to requirements. For example, a server receives a multimedia source file A.MP4 uploaded by a data source. However, since different types of services require the use of multimedia source files in different formats (for example, an H5 share page requires the MP4 format, videos in a master station are played in the FLV format, and adaptive playback to be recommended in the future requires the fMP4 format for separation of audio from a video), the server is required to perform format conversion to obtain formats other than A.MP4, such as the FLV format. It should be noted that the format conversion of a multimedia file is a technology known in the art, and the specific conversion process will not be repeated here.

In S12, format parsing for each of the at least two multimedia files is performed separately to obtain audio encoding data, video encoding data, and container format data of each of the at least two multimedia files.

In this step, the specific analysis process is as follows: parsing the audio encoding data of each of the at least two multimedia files according to the container format of each of the at least two multimedia files; parsing the video encoding data of each of the at least two multimedia files according to the container format of each of the at least two multimedia files; and generating the container format data of each of the at least two multimedia files according to data other than the audio encoding data and the video encoding data of each of the at least two multimedia files. For example, it is assumed that the multimedia files to be stored are MP4 and FLV files which have the same content. After analysis, as shown in FIG. 2A, audio encoding data V, video encoding data A, and container format data MP4C of the MP4 file are obtained, and audio encoding data V, video encoding data A, and container format data FLVC of the FLV file are also obtained, where the two files have the same audio encoding data V and video encoding data A and different container format data MP4C and FLVC.

In this step, the theoretical basis of analyzing the audio encoding data, the video encoding data and the container format data is as follows: a data protocol of each container format has a unified international standard. For example, it is assumed that the data protocol of an MP4 format file with a file size of 100B is as shown in Table 1 below, and the data protocol of a FLV format file with a file size of 100B is as shown in Table 2 below:

TABLE 1

| C | V | A | A | V | A | C |
|---|---|---|---|---|---|---|
| 35 | 15 | 10 | 10 | 15 | 10 | 5 |

TABLE 2

| C | V | C | A | C | A | C | V | C | A | C |
|---|---|---|---|---|---|---|---|---|---|---|
| 15 | 15 | 5 | 10 | 5 | 10 | 5 | 15 | 5 | 10 | 5 |

In Tables 1 and 2, V represents a video encoding data block, A represents an audio encoding data block, C represents an container format data block, and the numbers in the tables represent the coding lengths of the corresponding data blocks. It should be understood that, according to a data protocol standard of a corresponding container format, the corresponding audio encoding data, video encoding data and container format data can be analyzed from each multimedia file. For example, in the multimedia file shown in Table 1, bits 0 to 34 are coded as an container format data block, bits 35 to 49 are coded as an audio encoding data block, bits 50 to 59 are coded as a video encoding data block, bits 60 to 69 are coded as a video encoding data block, bits 70 to 84 are coded as an audio encoding data block, bits 85 to 94 are coded as a video encoding data block, and bits 95 to 99 are coded as an container format data block.

In the present application, the audio encoding data in the multimedia file is the data in all the audio encoding data blocks contained in the file, and the video encoding data in the multimedia file is the data in all the video encoding data blocks contained in the file, and the container format data in the multimedia file is the data in all the container format data blocks contained in the file.

In this step, when analyzing the file shown in Table 1, the audio and video encoding data are first analyzed from the file according to a data protocol of the MP4 format, and the data other than the audio and video encoding data of the file are then spliced to generate the container format data of the file (see Table 3 below); and when analyzing the file shown in Table 2, the audio and video encoding data are first analyzed from the file according to a data protocol of the FLV format, and the data other than the audio and video encoding data of the file are then spliced to generate the container format data of the file (see Table 4 below):

TABLE 3

| C | | | | C | |
|---|---|---|---|---|---|

TABLE 4

| C | C | C | C | C | C |
|---|---|---|---|---|---|

In S13, the container format data of each of the at least two multimedia files is separately stored, and one copy of the audio encoding data and video encoding data is stored. Specifically, the container format data of each of the at least two multimedia files is separately stored in a predetermined container format data storage; one copy of the audio encoding data is stored in a predetermined audio encoding data storage; and one copy of the video encoding data is stored in a predetermined video encoding data storage.

For example, as shown in FIG. 2A, it is assumed that two multimedia files to be stored, which have the same content and different container formats, are respectively a MP4 file and a FLV file. After the analysis process in step S12, audio encoding data V, video encoding data A, and container format data MP4C of the MP4 file are obtained, and audio encoding data V, video encoding data A, and container format data FLVC of the FLV file are also obtained. Since the two files have the same audio encoding data V and video encoding data A, only one copy of the audio encoding data and video encoding data can be stored to save the storage space; and since the two files have different container format data MP4C and FLVC, the container format data of the two need to be separately stored.

In S14, index data identifying encoding offset information and storage address information of the container format data, audio encoding data, and video encoding data of each of the at least two multimedia files are established and stored. Specifically, the index data is established first, the index data identifying the encoding offset information and storage address information of the container format data, audio encoding data, and video encoding data of each of the at least two multimedia files; and the established index data is then stored in a predetermined index data storage.

In this embodiment, the index data is established with reference to the following format:

```
[
  {
    "offset_ref": 0,
    "flag": "c",
    "size": 48,
    "offset": 0
  },
  {
    "offset_ref": 2490,
    "flag": "v",
    "size": 115944,
    "offset": 48
  },
  {
    "offset_ref": 1356,
    "flag": "a",
    "size": 372,
    "offset": 115992
  },
]
``` where "offset_ref" represents a starting storage address of a data block, "flag" represents a data block type, flag being "c" represents the data block being of an container format data type, flag being "v" represents the data block being of a video encoding data type, flag being "a" represents the data block being of an audio encoding data type, "size" represents the size of the data block, and "offset" represents a starting encoding offset of the data block in the corresponding multimedia file.

By using the method of multimedia file storage in this instance, only one copy of the same audio encoding data and video encoding data in multiple multimedia files can be stored, thereby the method can solve the problem in the prior art of repeated storage of the same audio encoding data and video encoding data due to the need to store multimedia files in multiple container formats required for different services, which causes a tremendous waste of a storage space. Moreover, in the method of multimedia file storage of the present application, the data is pre-stored to avoid the problem in the prior art of taking a long time (usually between around ten seconds and several minutes) for the server to perform format conversion after the server receives a request from the client, which causes a slow response of the server.

Embodiment II

Figure 3:
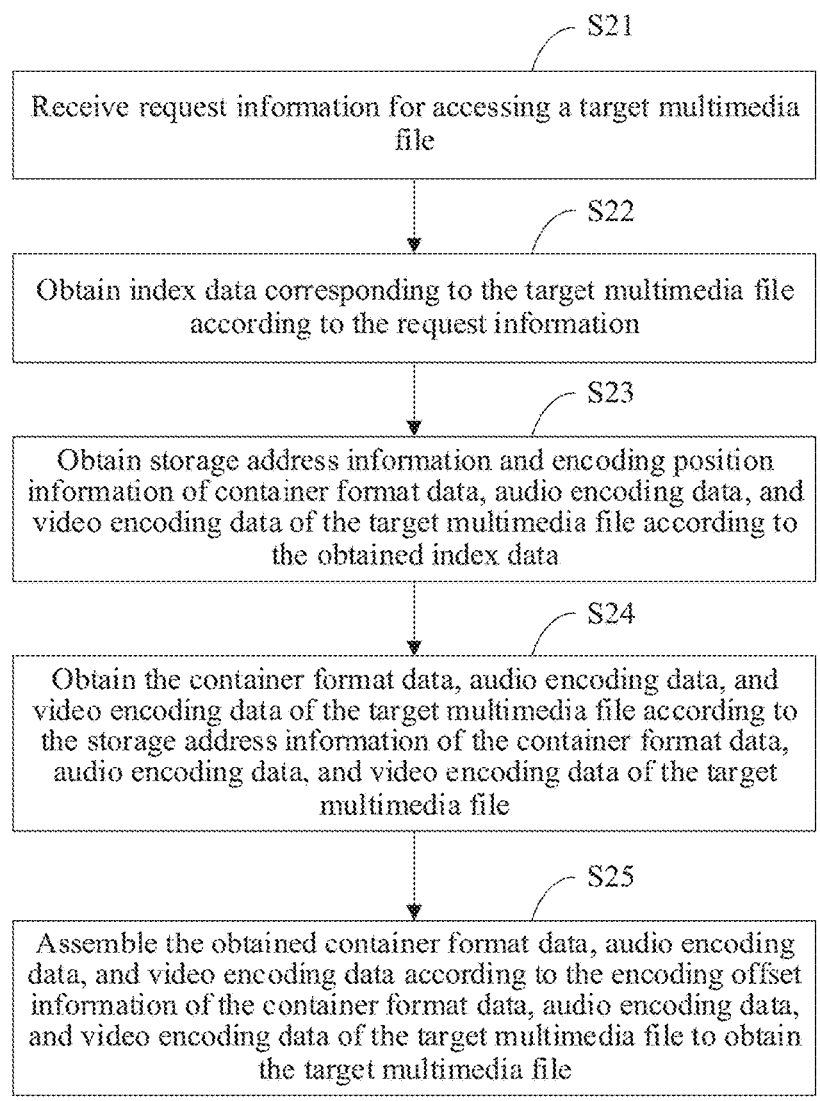
FIG. 3 is a flowchart of an embodiment of a method of multimedia file access according to the present application.

This embodiment provides a method of multimedia file access for accessing a multimedia file stored based on the method of Embodiment I, where the method is applicable to a server. As shown in FIG. 3, the method includes the steps as follows.

In S21, request information for accessing a target multimedia file is received. The request information includes an container format of the target multimedia file that is requested for access.

In S22, index data corresponding to the target multimedia file is obtained according to the request information. Specifically, the index data corresponding to the target multimedia file is obtained from a predetermined index data storage according to the request information. For example, when the target multimedia file that is requested for access by the request information is a movie A.MP4, index data corresponding to the movie A.MP4 is obtained.

In S23, storage address information and encoding offset information of container format data, audio encoding data, and video encoding data of the target multimedia file are obtained according to the obtained index data.

It can be seen from Embodiment I that, the index data carries the encoding offset information of the container format data, audio encoding data, and video encoding data of the target multimedia file, and the storage address information of the container format data, audio encoding data, and video encoding data of the target multimedia file.

In S24, the container format data, audio encoding data, and video encoding data of the target multimedia file are obtained according to the storage address information of the container format data, audio encoding data, and video encoding data of the target multimedia file. Specifically, the container format data of the target multimedia file is obtained from a predetermined container format data storage and according to the storage address information of the container format data of the target multimedia file; the audio encoding data of the target multimedia file is obtained from a predetermined audio encoding data storage and according to the storage address information of the audio encoding data of the target multimedia file; and the video encoding data of the target multimedia file is obtained from a predetermined video encoding data storage and according to the storage address information of the video encoding data of the target multimedia file.

For example, if the index data corresponding to the target multimedia file contains the following index content:

```
{
"offset_ref": 0,
"flag": "c",
"size": 48,
"offset": 0
},
``` starting from a storage address of 0, 48 bits of data are accessed as a container format data block.

In S25, the obtained container format data, audio encoding data, and video encoding data are assembled according to the encoding offset information of the container format data, audio encoding data, and video encoding data of the target multimedia file to obtain the target multimedia file. For example, if the index data contains the following index content:

```
{
"offset_ref": 0,
"flag": "c",
"size": 48,
"offset": 0
},
``` the container format data block formed by the 48 bits of data accessed starting from the storage address of 0 is assembled to 48 encoding offsets of the target multimedia file that start from the bit 0, and by analogy, the assembly of the target multimedia file can be completed.

In addition, a user may sometimes drag a video progress bar. In this case, the request information input by the user no longer involves requesting the access of a complete target multimedia file, and the request information includes a encoding offset range corresponding to the position of the progress bar. When the request information includes the encoding offset range, step S22 includes: obtaining, from the index data, storage address information and data types corresponding to the encoding offset range, the data type including an container format data type, an audio encoding data type, and a video encoding data type; and obtaining, according to the storage address information and the data types corresponding to the encoding offset range, the storage address information and encoding offset information of the container format data, audio encoding data, and video encoding data of the target multimedia file.

For example, if the request information involves requesting the access of the multimedia file in Table 1, and the request information carries a encoding offset range of 30 to 60, storage address information and data types (including container format data, audio encoding data, and video encoding data types) corresponding to encoding offsets 30 to 60 are determined from the index data of the file first, and data of the corresponding types are then obtained from the determined storage address information, that is, taking 5 pieces of container format data from storage addresses corresponding to the encoding offsets 29 to 34, taking 15 pieces of audio encoding data from storage addresses corresponding to the encoding offsets 35 to 49, and taking 10 pieces of video encoding data from storage addresses corresponding to the encoding offsets 50 to 59.

It should be noted that in Embodiment I and Embodiment II of the present application, the container format data storage, the audio encoding data storage, the video encoding data storage, and the index data storage may be integrated into the same server, or two or three of the above data memories are integrated into the same server, or they may be separately arranged in different servers, depending on the amount of data required to be stored.

When there is a large quantity of multimedia files to be stored, it is preferred that the container format data storage, the audio encoding data storage, the video encoding data storage, and the index data storage are separately arranged in different servers. Additionally, since the video encoding data in the multimedia file usually accounts for about 80%, the video encoding data storage is preferably a local storage, i.e., the video encoding data is preferably stored locally to reduce data transmission overheads. Moreover, storage addresses of the container format data storage, the audio encoding data storage, and the index data storage are saved in a predetermined first database, and when it is needed to access data, the address of the corresponding storage is obtained from the first database.

When the video encoding data is stored in the local storage, step S25 includes: downloading the obtained container format data, audio encoding data, and index data to the local storage; and assembling the container format data, audio encoding data, and video encoding data at the local storage according to the encoding offset information of the container format data, audio encoding data, and video encoding data of the target multimedia file to obtain the target multimedia file. The step of downloading the obtained container format data, audio encoding data, and index data to the local storage further includes: caching the container format data, audio encoding data, and index data that is downloaded to the local storage, so that there is no need to repeatedly download the container format data, audio encoding data, and index data of the target multimedia file when the target multimedia file is accessed again in a short time.

Figure 4:
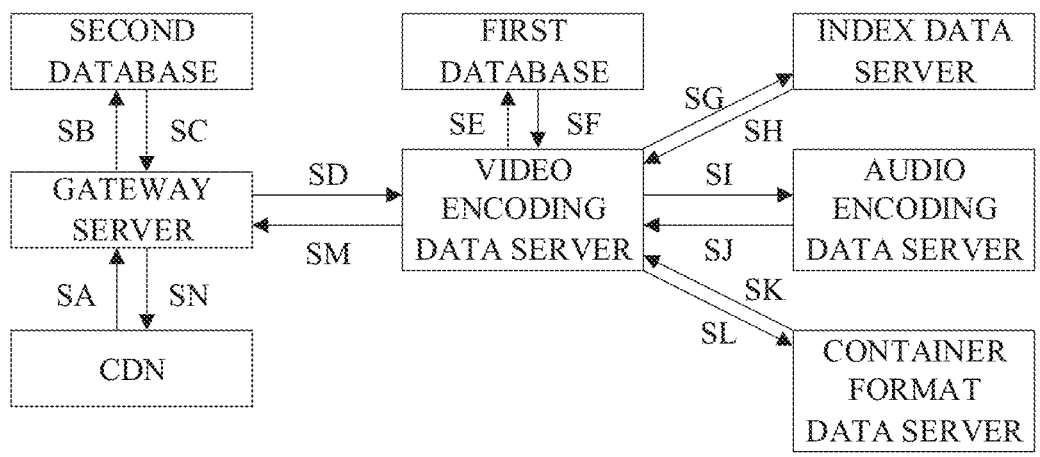
FIG. 4 is a swim lane chart of an embodiment of a method of multimedia file access according to the present application.

By taking the case where the container format data storage, the audio encoding data storage, the video encoding data storage, and the index data storage are separately arranged in different servers (denoted as a container format data server, an audio encoding data server, a video encoding server, and an index data server) as an example, the method of multimedia file access of the present application is further explained below. As shown in FIG. 4, the method includes the steps of:

SA, a CDN layer uploading, to a gateway server, file request information for access of a target multimedia file;

SB, the gateway server forwarding the file request information to a predetermined second database, where the second database pre-stores relevant information of each multimedia file to be accessed, including an address of a video encoding server corresponding to each multimedia file;

SC, the gateway server obtaining, from the second database, a server address of a video encoding server corresponding to the target multimedia file;

SD, the gateway server forwarding the file request information to the corresponding server (i.e., the video encoding server) according to the server address obtained from the second database;

SE, the video encoding server sending a query request to a first database according to the request information, to request the query of addresses of the servers where the audio encoding data, container format data, and index data of the target multimedia file are located, wherein the first database pre-stores addresses of servers where audio encoding data, container format data, and index data of each multimedia file to be accessed are located.

SF, the video encoding server accessing, from the first database, the addresses of the servers where the audio encoding data, container format data, and index data of the target multimedia file are located;

SG, the video encoding server sending index request information to the server (i.e., the index data server) where the index data of the target multimedia file is located, to request the access of the index data of the target multimedia file;

SH, the index data server returning the index data of the target multimedia file to the video encoding server;

SI, the video encoding server obtaining, from the index data, storage address information and encoding offset information of the container format data, audio encoding data, and video encoding data of the target multimedia file, and sending audio request information to the server (i.e., the audio encoding data server) where the audio encoding data of the target multimedia file is located, to request the access of the audio encoding data of the target multimedia file, where the audio request information carries the storage address information of the audio encoding data of the target multimedia file;

SJ, the audio encoding data server returning the audio encoding data of the target multimedia file to the video encoding server;

SK, the video encoding server sending container format data request information to the server (i.e., the container format data server) where the container format data of the target multimedia file is located, to request the access of the container format data of the target multimedia file, where the container format data request information carries a storage address of the container format data of the target multimedia file;

SL, the container format data server returning the container format data of the target multimedia file to the video encoding server;

SM, the video encoding server obtaining the video encoding data of the target multimedia file according to a storage address of the video encoding data of the target multimedia file, and then assembling the video encoding data, audio encoding data, and container format data of the target multimedia file according to the encoding offset information in the index data to obtain the target multimedia file, and then return the target multimedia file to the gateway server; and SN, the gateway server returning the target multimedia file to the CDN layer, and the process ends.

The method of multimedia file access of this embodiment consumes only a time of millisecond-level, and solves the problem in the prior art of it taking a long time (usually between around ten seconds and several minutes) for the server to perform format conversion after the server receives a request from the client, thus having a large impact on the user experience.

It should be understood that, for brief description, Embodiment I and Embodiment II are represented as a series of actions. However, it should be known to those skilled in the art that the present application is not limited to the order of describing the actions, because some steps may be performed in other orders or simultaneously according to the present application. In addition, it is also to be appreciated by those skilled in the art that all the embodiments described in the specification are preferred embodiments, and the related actions are not necessarily required in the present application.

Embodiment III

Figure 5:
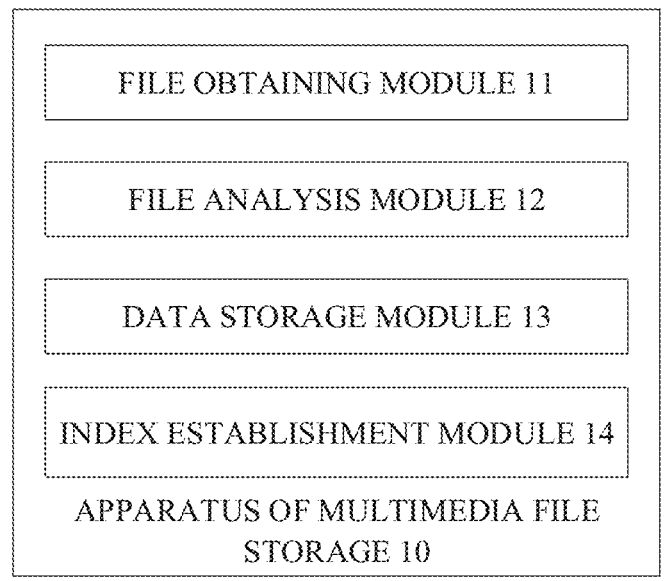
FIG. 5 is a structural block diagram of an embodiment of an apparatus of multimedia file storage according to the present application.

This embodiment provides an apparatus of multimedia file storage 10. As shown in FIG. 5, the apparatus includes:

a file obtaining module 11, configured to obtain at least two multimedia files to be stored, where the at least two multimedia files have the same audio encoding data, the same video encoding data, and different container format data;

a file analysis module 12, configured to perform format parsing for each of the at least two multimedia files separately to obtain audio encoding data, video encoding data, and container format data of each of the at least two multimedia files;

a file data storage module 13, configured to store the container format data of each of the at least two multimedia files separately, and store one copy of the audio encoding data and video encoding data; and an index establishment module 14 configured to establish and store index data identifying encoding offset information and storage address information of the container format data, audio encoding data, and video encoding data of each of the at least two multimedia files.

In this embodiment, the file obtaining module 11 includes:
a file receiving unit for receiving a multimedia source file in an original container format;
a conversion unit for converting the multimedia source file into at least one target container format different from the original container format; and
a file determination unit for determining the multimedia source file in the original container format and the multimedia source file in the at least one target container format as the at least two multimedia files to be stored.

In this embodiment, the file analysis module 12 includes:
an audio encoding data analysis unit for parsing the audio encoding data of each of the at least two multimedia files according to the container format of each of the at least two multimedia files;
a video encoding data analysis unit for parsing the video encoding data of each of the at least two multimedia files according to the container format of each of the at least two multimedia files; and
an container format data analysis unit for generating the container format data of each of the at least two multimedia files according to data other than the audio encoding data and the video encoding data of each of the at least two multimedia files.

In this embodiment, the file data storage module 13 includes:
an container format data storage unit for separately storing the container format data in each of the multimedia files in a predetermined container format data storage;
an audio encoding data storage unit for storing one copy of the audio encoding data in a predetermined audio encoding data storage; and
a video encoding data storage unit for storing one copy of the video encoding data in a predetermined video encoding data storage.

In this embodiment, the video encoding data storage is preferably a local storage.

In this embodiment, the index establishment module 14 includes:
an index establishment unit for establishing the index data, the index data identifying the encoding offset information and storage address information of the container format data, audio encoding data, and video encoding data of each of the at least two multimedia files; and
an index storage unit for storing the index data in a predetermined index data storage.

In this embodiment, the apparatus 10 further includes:
a storage address saving module for saving storage addresses of the container format data storage, the audio encoding data storage, and the index data storage into a predetermined first database.

Embodiment IV

Figure 6:
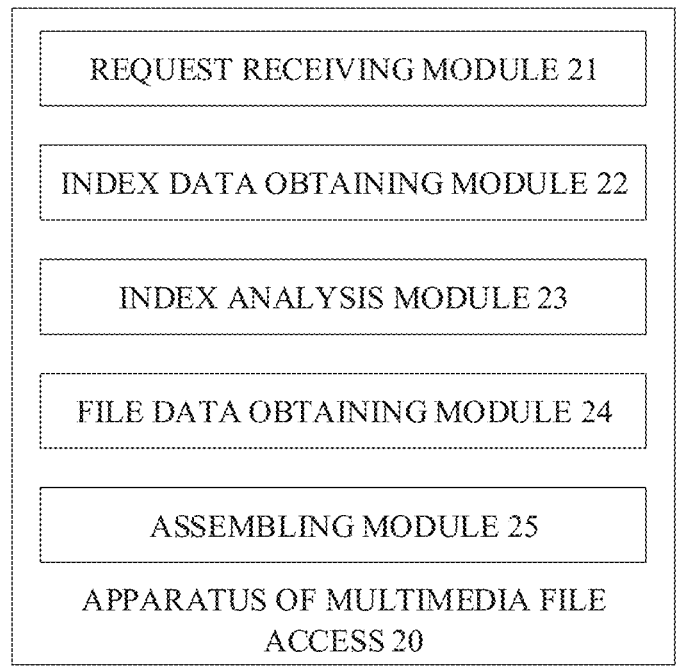
FIG. 6 is a structural block diagram of an embodiment of an apparatus of multimedia file access according to the present application.

This embodiment provides an apparatus of multimedia file access 20 for accessing multimedia files stored based on the foregoing apparatus of multimedia file storage. As shown in FIG. 6, the apparatus 20 includes:
a request receiving module 21, configured to receive request information for accessing a target multimedia file;
an index data obtaining module 22, configured to obtain, according to the request information, index data corresponding to the target multimedia file;
an index analysis module 23, configured to obtain, according to the obtained index data, storage address information and encoding offset information of container format data, audio encoding data, and video encoding data of the target multimedia file;
a file data obtaining module 24, configured to obtain the container format data, audio encoding data, and video encoding data of the target multimedia file according to the storage address information of the container format data, audio encoding data, and video encoding data of the target multimedia file; and
an assembling module 25, configured to assemble the obtained container format data, audio encoding data, and video encoding data according to the encoding offset information of the container format data, audio encoding data, and video encoding data of the target multimedia file to obtain the target multimedia file.

In this embodiment, the index data obtaining module 22 is specifically configured to:
obtain, from a predetermined index data storage and according to the request information, the index data corresponding to the target multimedia file.

In this embodiment, the file data obtaining module 24 includes:
an container format data obtaining unit for obtaining the container format data of the target multimedia file from a predetermined container format data storage and according to the storage address information of the container format data of the target multimedia file;
an audio encoding data obtaining unit for obtaining the audio encoding data of the target multimedia file from a predetermined audio encoding data storage and according to the storage address information of the audio encoding data of the target multimedia file; and
a video encoding data obtaining unit for obtaining the video encoding data of the target multimedia file from a predetermined video encoding data storage and according to the storage address information of the video encoding data of the target multimedia file.

In this embodiment, the video encoding data storage is preferably a local storage.

In this embodiment, the assembling module 25 includes:
a data download unit for downloading the obtained container format data, audio encoding data, and index data to the local storage; and
a data assembling unit for assembling the container format data, audio encoding data, and video encoding data at the local storage according to the encoding offset information of the container format data, audio encoding data, and video encoding data of the target multimedia file to obtain the target multimedia file.

In this embodiment, the data download unit is further used for:
caching the container format data, audio encoding data, and index data that is downloaded to the local storage.

In this embodiment, when the request information includes the encoding offset range, the index analysis module 23 is specifically configured to:
obtain, from the index data, storage address information and data types corresponding to the encoding offset range, the data type including an container format data type, an audio encoding data type, and a video encoding data type; and
obtain, according to the storage address information and the data types corresponding to the encoding offset range, the storage address information and encoding offset information of the container format data, audio encoding data, and video encoding data of the target multimedia file.

Embodiment V

Figure 7:
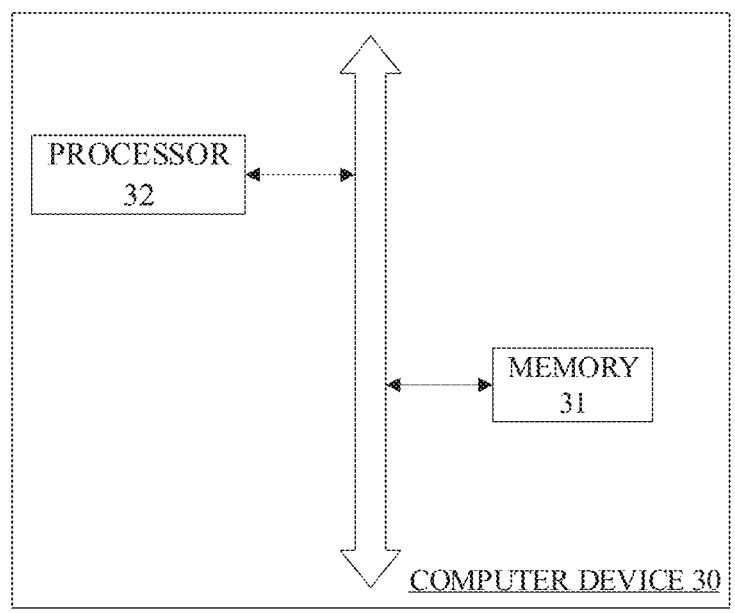
FIG. 7 is a hardware architecture diagram of an embodiment of a computer device according to the present application.

The present application further provides a computer device, for example, a smart phone, a tablet computer, a notebook computer, a desktop computer, a rack memory, a blade memory, a tower memory, or a cabinet memory (including an independent memory, or a memory cluster composed of a plurality of memories) that can execute programs, etc. The computer device 30 in this embodiment at least includes but is not limited to: a memory 31 and a processor 32 that can be communicatively connected to each other via a system bus, as shown in FIG. 7. It should be noted that FIG. 7 shows only the computer device 30 having components 31 to 32, but it should be understood that implementing all of the shown components is not a requirement, and more or fewer components may be implemented instead.

In this embodiment, the memory 31 (i.e., a readable storage medium) includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 31 may be an internal storage unit of the computer device 30, for example, a hard disk or a memory of the computer device 30. In some other embodiments, the memory 31 may alternatively be an external storage device of the computer device 30, for example, a plug-in hard disk provided on the computer device 30, a smart media card (SMC), a secure digital (SD) card, a flash card, etc. Certainly, the memory 31 may alternatively include both the internal storage unit of the computer device 30 and the external storage device thereof. In this embodiment, the memory 31 is generally used to store an operating system and various types of application software installed in the computer device 30, such as the program code of the apparatus of multimedia file storage 10 in Embodiment III or the apparatus of multimedia file access 20 in Embodiment IV. In addition, the memory 31 may further be used to temporarily store various types of data that have been output or will be output.

The processor 32 may be, in some embodiments, a central processing unit (CPU), a controller, a microcontroller, a microprocessor, or other data processing chips. The processor 32 is generally used to control the overall operation of the computer device 30. In this embodiment, the processor 32 is used to run program code or processing data stored in the memory 31, for example, to run the apparatus of multimedia file storage 10 to implement the method of multimedia file storage in Embodiment I, or to run the apparatus of multimedia file access 20 to implement the method of multimedia file access in Embodiment II.

Embodiment VI

The present application further provides a computer-readable storage medium, such as a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a memory, and an App application store, on which computer-readable instructions are stored to enable corresponding functions to be implemented when a program is executed by a processor.

The computer-readable storage medium in this embodiment is used to store the apparatus of multimedia file storage 10 that, when executed by a processor, implements the method of multimedia file storage in Embodiment I, or the computer-readable storage medium in this embodiment is used to store the apparatus of multimedia file access 20 that, when executed by a processor, implements the method of multimedia file access in Embodiment II.

Through the description of the above implementations, those skilled in the art can clearly understand that the methods in the above embodiments may be implemented by software and necessary general hardware platforms, or may be definitely implemented by hardware, but the former implementation is preferred in many cases.

The foregoing descriptions are merely illustrative of preferred embodiments of the present application, and are not intended to limit the patent scope of the present application. Any equivalent structure or equivalent process transformation made using the contents of the specification and accompanying drawings of the present application, or any direct or indirect application thereof in other related technical fields shall equally fall within the patent protection scope of the present application.

What is claimed is:

1. A method of processing multimedia files, comprising:
obtaining at least two multimedia files to be stored, wherein each of the at least two multimedia files comprise audio encoding data, video encoding data, and container format data, the audio encoding data in each of the at least two multimedia files are the same, the video encoding data in each of the at least two multimedia files are the same, and the container format data in each of the at least two multimedia files are different;
performing format parsing on each of the at least two multimedia files separately;
splicing data other than the audio and video encoding data from each of the at least two multimedia files to generate the container format data corresponding to each of the at least two multimedia files;
storing the container format data corresponding to each of the at least two multimedia files separately in a first predetermined storage configured to store the container format data;
storing one copy of the audio encoding data in a second predetermined storage and storing one copy of the video encoding data in a third predetermined storage, the one copy of the audio encoding data and the one copy of the video encoding data being representative of the audio encoding data and the video encoding data from the at least two multimedia files, the second predetermined storage configured to store the audio encoding data, and the third predetermined storage configured to store the video encoding data; and
generating index data, wherein the index data comprise information of identifying encoding offset of the container format data, the audio encoding data, and the video encoding data in each of the at least two multimedia files, and wherein the index data further comprise information indicative of storage addresses of the container format data stored in the first predetermined storage, the one copy of the audio encoding data stored in the second predetermined storage, and the one copy of the video encoding data stored in the third predetermined storage;
storing the index data in a fourth predetermined storage configure to store the index data; and
generating a target multimedia file based on retrieving data from the fourth predetermined storage, the first predetermined storage, the second predetermined storage, and the third predetermined storage in response to receiving a request for accessing a target multimedia file.

2. The method of claim 1, wherein the obtaining at least two multimedia files to be stored further comprises:
   receiving a multimedia source file in an original container format;
   converting the multimedia source file into at least one target container format, wherein the at least one target container format is different from the original container format; and
   identifying the multimedia source file in the original container format and the multimedia source file in the at least one target container format as the at least two multimedia files to be stored.

3. The method of claim 1, wherein performing format parsing on each of the at least two multimedia files separately to obtain the audio encoding data, the video encoding data, and the container format data from each of the at least two multimedia files further comprises:
   parsing the audio encoding data of each of the at least two multimedia files based on a container format corresponding to each of the at least two multimedia files;
   parsing the video encoding data of each of the at least two multimedia files based on the container format corresponding to each of the at least two multimedia files; and
   generating the container format data corresponding to each of the at least two multimedia files based on data other than the audio encoding data and the video encoding data comprised in each of the at least two multimedia files.

4. The method of claim 1, wherein the third predetermined storage is a local storage.

5. The method of claim 1, further comprising:
   storing storage addresses of the first predetermined storage, the second predetermined storage, and the fourth predetermined storage into a predetermined first database.

6. A computing device, comprising a memory, a processor, and computer-readable instructions stored on the memory and executable on the processor, wherein the processor, upon executing the computer-readable instructions, performs operations comprising:
   obtaining at least two multimedia files to be stored, wherein each of the at least two multimedia files comprise audio encoding data, video encoding data, and container format data, the audio encoding data in each of the at least two multimedia files are the same, the video encoding data in each of the at least two multimedia files are the same, and the container format data in each of the at least two multimedia files are different;
   performing format parsing on each of the at least two multimedia files separately;
   splicing data other than the audio and video encoding data from each of the at least two multimedia files to generate the container format data corresponding to each of the at least two multimedia files;
   storing the container format data corresponding to each of the at least two multimedia files separately in a first predetermined storage configured to store the container format data;
   storing one copy of the audio encoding data in a second predetermined storage and storing one copy of the video encoding data in a third predetermined storage, the stored one copy of the audio encoding data and the one copy of the video encoding data being representative of the audio encoding data and the video encoding data from the at least two multimedia files, the second predetermined storage configured to store the audio encoding data, and the third predetermined storage configured to store the video encoding data; and
   generating index data, wherein the index data comprise information of identifying encoding offset of the container format data, the audio encoding data, and the video encoding data in each of the at least two multimedia files, and wherein the index data further comprise information indicative of storage address of the container format data stored in the first predetermined storage, the one copy of the audio encoding data stored in the second predetermined storage, and the one copy of the video encoding data stored in the third predetermined storage;
   storing the index data in a fourth predetermined storage configure to store the index data; and
   generating a target multimedia file based on retrieving data from the fourth predetermined storage, the first predetermined storage, the second predetermined storage, and the third predetermined storage in response to receiving a request for accessing a target multimedia file.

7. A non-transitory computer-readable storage medium having stored thereon computer-readable instructions, which upon executed by a processor, cause the processor to perform operations comprising:
   obtaining at least two multimedia files to be stored, wherein each of the at least two multimedia files comprise audio encoding data, video encoding data, and container format data, the audio encoding data in each of the at least two multimedia files are the same, the video encoding data in each of the at least two multimedia files are the same, and the container format data in each of the at least two multimedia files are different;
   performing format parsing on each of the at least two multimedia files separately;
   splicing data other than the audio and video encoding data from each of the at least two multimedia files to generate the container format data corresponding to each of the at least two multimedia files;
   storing the container format data from each of the at least two multimedia files separately in a first predetermined storage configured to store the container format data:
   storing one copy of the audio encoding data in a second predetermined storage and storing one copy of the video encoding data in a third predetermined storage and one copy of the video encoding data, the one copy of the audio encoding data and the stored one copy of the video encoding data being representative of the audio encoding data and the video encoding data from the at least two multimedia files, the second predetermined storage configured to store the audio encoding data, and the third predetermined storage configured to store the video encoding data; and
   generating index data, wherein the index data comprise information of identifying encoding offset of the container format data, the audio encoding data, and the video encoding data in each of the at least two multimedia files, and wherein the index data further comprise information indicative of storage address of the container format data stored in the first predetermined storage, the one copy of the audio encoding data, and the one copy of the video encoding data stored in the third predetermined storage;
storing the index data in a fourth predetermined storage configure to store the index data; and
generating a target multimedia file based on retrieving data from the fourth predetermined storage, the first predetermined storage, the second predetermined storage, and the third predetermined storage in response to receiving a request for accessing a target multimedia file.

8. The method of claim 1, wherein the generating a target multimedia file further comprises:
receiving the request for accessing the target multimedia file;
obtaining index data corresponding to the target multimedia file based on information comprised in the request;
obtaining storage address information and encoding offset information of container format data, audio encoding data, and video encoding data corresponding to the target multimedia file based on the obtained index data;
obtaining the container format data, the one copy of the audio encoding data, and the one copy of the video encoding data corresponding to the target multimedia file based on the storage address information of the container format data, the audio encoding data, and the video encoding data; and
assembling the obtained container format data, the obtained audio encoding data, and the obtained video encoding data based on the encoding offset information of the container format data, the one copy of the audio encoding data, and the one copy of the video encoding data to obtain the target multimedia file.

9. The method of claim 8, wherein the obtaining index data corresponding to the target multimedia file based on information comprised in the request further comprises:
obtaining, from the fourth predetermined storage, the index data corresponding to the target multimedia file based on the information comprised in the request.

10. The method of claim 8, wherein the third predetermined storage is a local storage.

11. The method of claim 10, wherein the assembling the obtained container format data, the obtained audio encoding data, and the obtained video encoding data based on the encoding offset information of the container format data, the audio encoding data, and the video encoding data to obtain the target multimedia file further comprises:
downloading the obtained container format data, the obtained audio encoding data, and the obtained index data to the local storage; and
assembling the obtained container format data, the obtained audio encoding data, and the obtained video encoding data at the local storage based on the encoding offset information of the container format data, audio encoding data, and video encoding data to obtain the target multimedia file.

12. The method of claim 8, wherein when the request comprises information indicative of an encoding offset range, the obtaining storage address information and encoding offset information of container format data, audio encoding data, and video encoding data corresponding to the target multimedia file further comprises:
obtaining, from the index data, storage address information and data types corresponding to the encoding offset range, wherein the data types comprise a container format data type, an audio encoding data type, and a video encoding data type; and
obtaining, according to the storage address information and the data types corresponding to the encoding offset range, the storage address information and the encoding offset information of the container format data, the audio encoding data, and the video encoding data.

13. The method of claim 1, wherein the index data corresponding to each of the at least two multimedia files further comprise a starting storage address of each data block of a corresponding multimedia file among the at least two multimedia files, information indicative of a type of each data block of the corresponding multimedia file, a size of each data block of the corresponding multimedia file, and a starting encoding offset of each data block in the corresponding multimedia file.

14. The computing device of claim 6, the operations further comprising:
receiving a multimedia source file in an original container format;
converting the multimedia source file into at least one target container format, wherein the at least one target container format is different from the original container format; and
identifying the multimedia source file in the original container format and the multimedia source file in the at least one target container format as the at least two multimedia files to be stored.

15. The computing device of claim 6, the operations further comprising:
generating the container format data corresponding to each of the at least two multimedia files based on data other than the audio encoding data and the video encoding data comprised in each of the at least two multimedia files.

16. The computing device of claim 6, wherein the index data corresponding to each of the at least two multimedia files further comprise a starting storage address of each data block of a corresponding multimedia file among the at least two multimedia files, information indicative of a type of each data block of the corresponding multimedia file, a size of each data block of the corresponding multimedia file, and a starting encoding offset of each data block in the corresponding multimedia file.

* * * * *